(12) United States Patent
Uslu (10) Patent No.: US 12,038,066 B2
(45) Date of Patent: Jul. 16, 2024

(54) CLAMP FOR FLAT BELTS

(71) Applicant: GATES CORPORATION, Denver, CO (US)

(72) Inventor: Binyamin Uslu, Pfungstadt (DE)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 17/588,996

(22) Filed: Jan. 31, 2022

(65) Prior Publication Data

US 2023/0243403 A1 Aug. 3, 2023

(51) Int. Cl.
*F16G 11/04* (2006.01)
*F16B 2/14* (2006.01)

(52) U.S. Cl.
CPC ............... *F16G 11/04* (2013.01); *F16B 2/14* (2013.01)

(58) Field of Classification Search
CPC .......... Y10T 24/3973; Y10T 403/4345; Y10T 24/3971; Y10T 24/3969; F16G 11/046; F16G 11/04; B66B 7/085; F16B 2/14
See application file for complete search history.

(56) References Cited

U.S. PATENT DOCUMENTS

| | | | |
|---|---|---|---|
| 7,607,204 B2* | 10/2009 | Ach | B66B 7/085 24/136 R |
| 7,740,113 B2* | 6/2010 | Ach | B66B 7/085 24/115 M |
| 8,181,312 B2* | 5/2012 | Attinger | B66B 7/085 24/115 R |
| 8,505,173 B2* | 8/2013 | Pitts | B66B 7/085 24/136 R |
| 10,870,557 B2* | 12/2020 | Ma | B66B 7/062 |
| 2002/0154945 A1* | 10/2002 | Ericson | F16G 11/046 403/374.1 |
| 2007/0017749 A1* | 1/2007 | Dold | B66B 7/085 187/251 |

OTHER PUBLICATIONS

Commisioner for Patents; Notification of Transmittal of the International Search Report and the Written Opinion of the International Searching Authority, or the Declaration; International Application No. PCT/US2023/061598; dated Feb. 27, 2023.

* cited by examiner

*Primary Examiner* — Robert Sandy
(74) *Attorney, Agent, or Firm* — Kevin J. Aiken, Esq.

(57) ABSTRACT

A clamp for open ended flat belts. The clamp has a tapered housing with an aperture at a first end providing access to the housing interior and a second open end also providing access to the interior. A tapered wedge is removable and replaceable from the interior of the housing, the wedge having a first end and a radiused second end and having a surface comprising alternating ribs and lands. The clamp includes a lock having a concave surface similar to the radiused second end of the tapered wedge. The housing may have a removeable and replaceable side wall providing access to the interior.

11 Claims, 6 Drawing Sheets

CLAMP FOR FLAT BELTS

BACKGROUND

Flat belts are available as an extended length of belt that are "open," having a first distinct end and a second distinct end. Flat belts, in general, have rectangular cross-sections where the width is larger than the thickness. Flat belts can be adapted to a wide range of mechanical requirements for use in conveying, lifting, food & beverage, and industrial applications. In addition to use as conveyor belts and other material handling belts, flat belts are used, for example, as haul-off belts for haul-off of cables, pipes, wires and ropes, processing belts for the metal industry, e.g., to spool rolled metals or sheet metals into coils, winding belts for winding of paper and cardboard sleeves, and timing belts for the control of linear movements synchronous to conveyors and drive systems. Flat belts are increasingly being used in high load applications, such as in passenger elevators and forklifts, to provide the linear movement of the car and forks, respectively.

Flat belts are adapted to a wide range of mechanical requirements, with combinations of different types of materials and reinforcing cords designed for each application. Flat belts are available as high strength and low stretch for a long working service life. They are available with grooves, ribs, teeth, and flat (no topography).

Open ended flat belts typically are joined end-to-end or an end is connected (mounted) to equipment. Typically, a clamp is attached to the flat belt; the clamp is one that either applies direct pressure to the belt (e.g., by screwing) or that applies tangential pressure by using a wedge clamp. With both mechanisms, the force from the clamp (completely or in parts) is transferred to the flat belt by friction on the surface of the belt, which, unfortunately, allows possible slipping of the flat belt.

What is needed is a clamp that holds a flat belt better and that has easy assembly as well.

SUMMARY

The present disclosure provides a clamp for open ended, flat belts, the clamp having an accessible housing interior and a profiled retaining wedge that fits within the interior, having sufficient space between the interior wall surfaces of the housing to accommodate a loop of the flat belt. The clamp includes a lock configured to conform to the retaining wedge.

In one particular implementation, this disclosure provides a clamp having a tapered housing having a first end with an aperture providing access to an interior of the housing and a second open end providing access to the interior, the second end larger than the first end, the housing having a removeable and replaceable side wall providing access to the interior. The clamp also has a tapered wedge removable and replaceable from the interior of the housing, the wedge having a first end and a radiused second end and having a surface comprising alternating ribs and lands.

In another particular implementation, this disclosure provides a clamp having an asymmetrical housing having a top wall, an opposite bottom wall, a first end with an aperture providing access to an interior of the housing and a second open end providing access to the interior, an inner surface of the top wall and an inner surface of the bottom wall forming an angle in the range of 30 to 60 degrees at the first end, the housing having a removeable and replaceable side wall providing access to the interior. The clamp also has an asymmetrical tapered wedge removable and replaceable from the interior of the housing, the wedge having a first end having an angle in the range of 30 to 60 degrees and a radiused second end and having a surface comprising alternating ribs and lands.

In yet another particular implementation, this disclosure provides a method of installing a terminal clamp on an open-ended flat belt. The method includes inserting the free end of the flat belt through an aperture in a first end of a clamp housing, and passing the free end of the flat belt through the clamp housing to and through a second end of the clamp housing, and doubling back the free end of the flat belt through the clamp housing and through the aperture to form a loop in the flat belt. The method also includes inserting a wedge into the loop, applying tension to the flat belt to pull the wedge and the loop toward the aperture in the first end of the clamp housing, and after inserting the wedge, placing a lock against the loop; and after placing the lock against the loop, installing a side wall on the clamp housing.

Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

FIGS. 5A through 5E are side views of steps of a method for installing a flat belt on a clamp.

DETAILED DESCRIPTION

As indicated above, the present disclosure is directed to a clamp for retaining an open-ended flat belt, such as a toothed flat belt.

Open ended flat belts are convenient because they can be used for essentially any length of application, assuming the application is shorter than the length of the belt, without the need for having a specific length belt, because the flat belt can be shorted to the length needed. Typically, the flat belt is not cut, but rather, a mounting fixture is applied to the flat belt at the desired position along the belt.

The design of flat belts has evolved to produce belts that are comparable in strength to steel ropes but with increased flexibility and fatigue characteristics. Equipment or applications evolving to use open ended flat belts include elevators and forklifts.

There are two typical mounting mechanisms for attaching fixtures to open ended flat belts—clamping the flat belt in a clamp by applying direct pressure to the belt (e.g., by screwing) and by clamping the flat belt in a wedge clamp. With both mechanisms, the force from the clamp is transferred to the flat belt by friction on the surface of the belt, which, unfortunately, allows possible slipping of the flat belt.

Clamping via fasteners such as screws can damage the belt if too much torque is applied to the fasteners. If too little clamping force is applied, the belt can slip, which can also damage the belt. For some clamp and flat belt combinations, the belt/clamp interface area needed for a successful engagement is fairly high, leading to a physically large clamp; in some applications, a large clamp is not practical. Attempts have been made to overcome the issues with the needed high surface area engagement by using a hybrid of a flat belt and a toothed belt, however, such arrangements still are not practical. As with a flat belt, if the clamping force is too low on a hybrid belt, the belt can slip, which can often lead to damage of the belt. Additionally, although a smaller clamp can be used, it is still large compared to a clamp for a chain drive having the same size.

Similarly, wedge clamps (for flat belts, hybrid belts, and toothed belts) are larger than clamps for cables or chain drives that have similar forces. Additionally with wedge clamps, no matter the type of belt, if the force or tension on the clamped belt reverses or even loosens, the clamp can inadvertently release the belt.

The following description provides a clamp for a belt having low profile teeth, the clamp having a form fitting wedge to engage with the teeth. The wedge dimensions are optimized to decrease the size of the clamp while maintaining sufficient surface area engagement. The clamp includes an adjustable lock to inhibit belt loosening if the belt tension loosens or reverses.

In the following description, reference is made to the accompanying drawings that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Figure 1A:
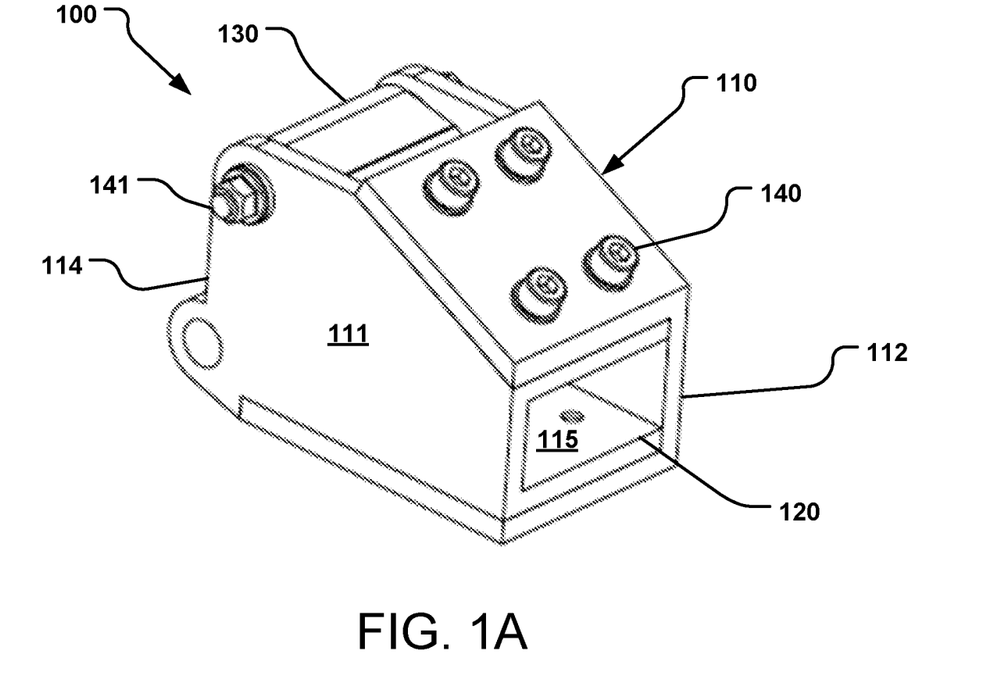
FIG. 1A is a perspective view of a clamp.
Figure 1B:
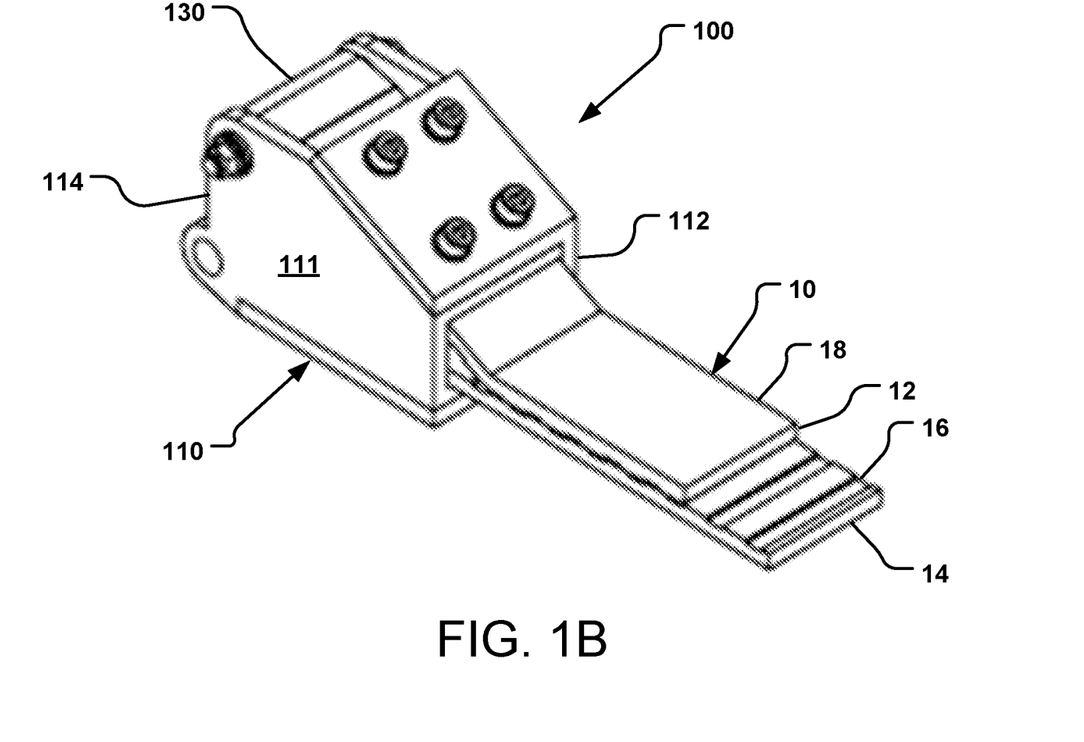
FIG. 1B is a perspective view of the clamp with a flat belt retained thereby.

Turning to the figures, FIG. 1A shows a clamp 100 and FIG. 1B shows the clamp 100 engaged with a flat belt 10.

The clamp 100 has a housing or body 110 that has a first end 112 and an opposite second end 114. The first end 112 may be referred to as a front end or an open end, due to an aperture 120 providing access to an interior 115 of the housing 110. The second end 114, which also has an opening, may be referred to as a back end or back side or the like. The second end 114 may have a slit or a slot having a thickness no less than the thickness of the belt which will be clamped with the clamp 100, or, the opening may be two slits or slots, or the opening may be as large as or larger than the aperture 120. In some designs, the entire second end is open, with no wall structure.

The housing 110 has a generally tapered shape, with the first end 112 having a lower height than the second end 114.

The housing 110 has a side wall 111 on each side of the housing 110, one of which is seen in the figures. In some designs, one (or both) of the side walls 111 is removeable and replaceable, e.g., via a fastener 141 such as a bolt and nut. A removeable side wall 111 facilitates access to the interior 115 of the housing 110.

At or on the second end 114 is an adjustable lock or stop 130, which is removable from and replaceable in the housing 110; when installed, the lock 130 is present in the interior 115 of the housing 110. The lock 130 can be removed through the open second end 114 or when the side wall 111 is removed. Additional details of the lock 130 are provided below. Not seen in FIG. 1A nor FIG. 1B, a retaining wedge is positioned in the interior 115 of the housing 110, the retaining wedge engaging with the flat belt 10.

FIG. 1B shows the flat belt 10 in the clamp 100, the belt 10 having a first end 12 and a second end 14, with a front side 16 and a back side 18, which typically is considered smooth. The front side 16 may be smooth or may have a texture or profile, such as transverse ribs or grooves, which in some embodiments, such a profile may be referred to as toothed; in FIG. 1B, the front side 16 is toothed. The flat belt 10 is positioned within the interior 115 of the housing 110 and is engaged by the retaining wedge between the first end 12 and the second end 14 of the belt 10.

Figure 2:
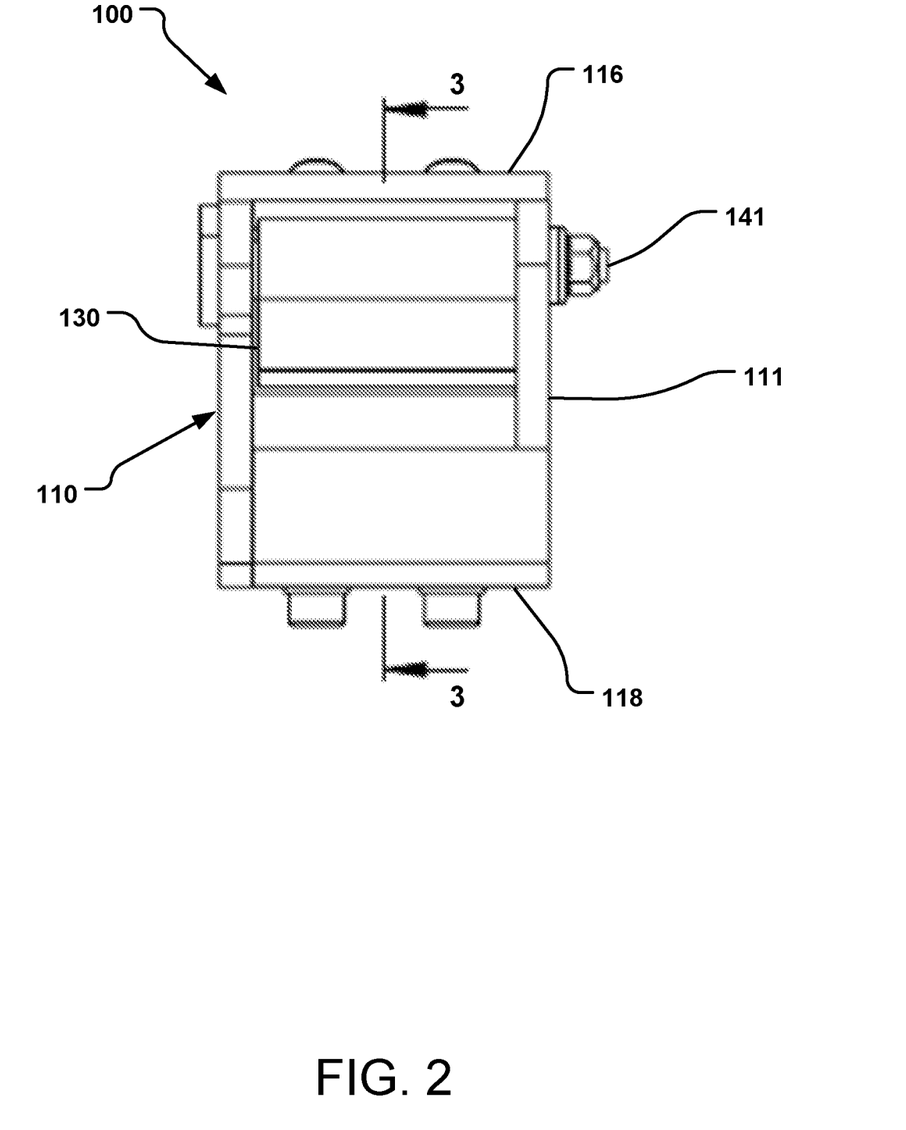
FIG. 2 is a back side plan view of the clamp of FIG. 1.

FIG. 2 shows the clamp 100 from the perspective of the back side or second end 114. The lock 130, although positioned in the interior 115 of the housing 110, is viewable through the open back end 114.

Figure 3:
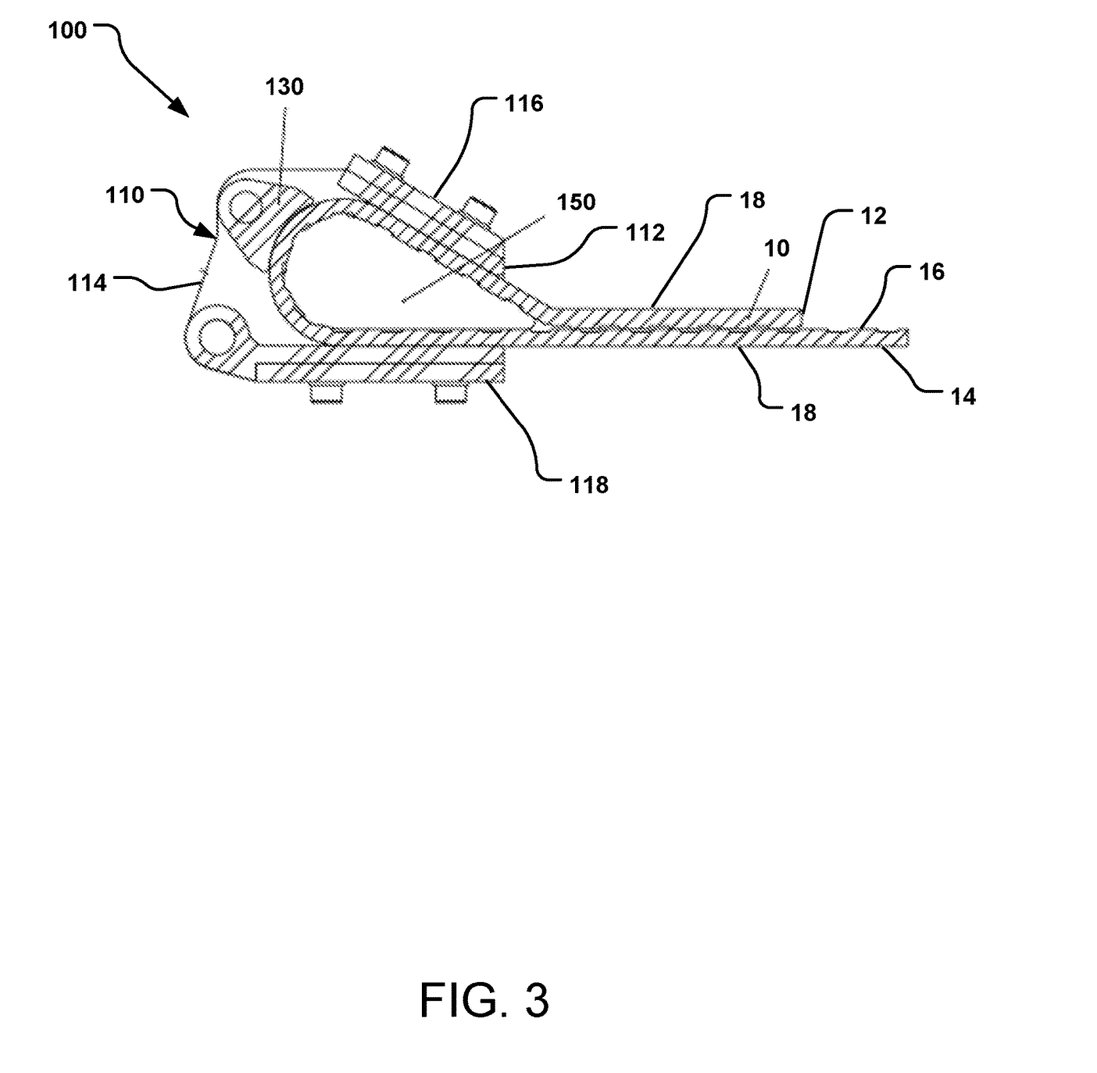
FIG. 3 is a cross-sectional side view taken along line 3-3 of FIG. 2.

FIG. 3 is a cross-section of the clamp 100, showing the interior 115 of the clamp 100. Also called out in FIG. 3 is the housing 110, the first or open end 112 and the aperture 120, the back end 114, the lock 130, and a retaining wedge 150. The housing 110 has a top wall 116 and a bottom wall 118. The housing 110 has a generally tapered shape, with the distance between the top wall 116 and the bottom wall 118 at the first end 112 less than the distance between the top wall 116 and the bottom wall 118 at the second end 114. The housing 110 is also asymmetrical or non-symmetrical about an axis that extends from the first end 112 to the second end 114.

The flat belt 10 is present in the clamp 100, accessing the interior 115 view the aperture 120, wrapped around and retained by the retaining wedge 150. The belt 10 is positioned with the front side 16 of the belt 10 against the wedge 150 and the smooth back side 18 of the belt 10 against the inner surfaces of the top wall 116 and the bottom wall 118. The lock 130 is engaged against the back side 18 of the belt 10 at the second, back end 114 of the housing 110.

Figure 4A:
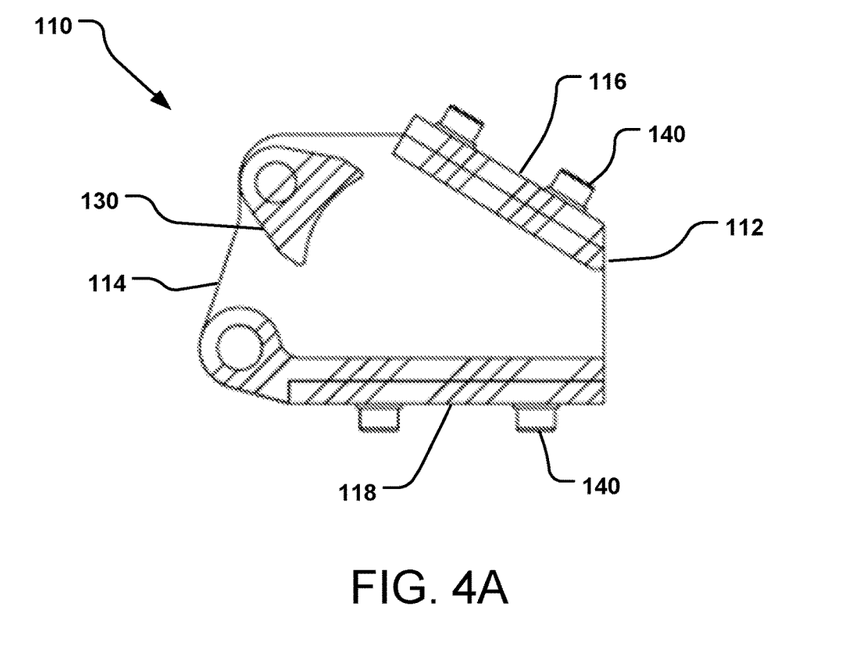
FIG. 4A is a cross-sectional side view of the housing of the clamp.
Figure 4B:
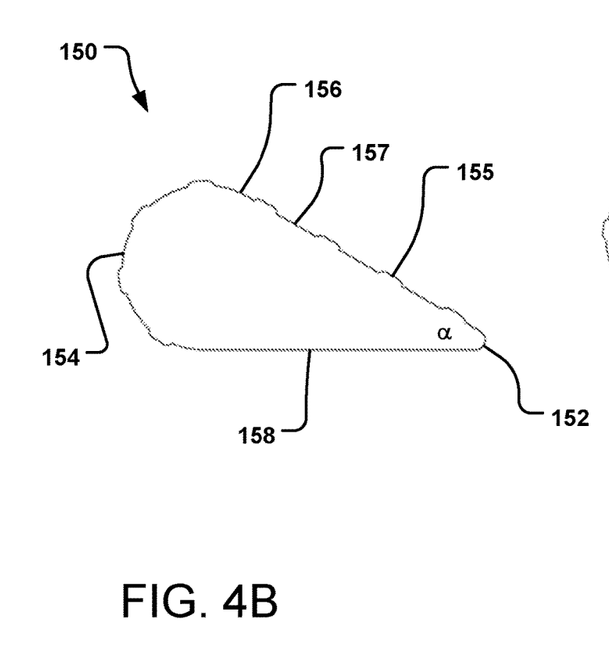
FIG. 4B is a side view of the retaining wedge of the clamp.
Figure 4C:
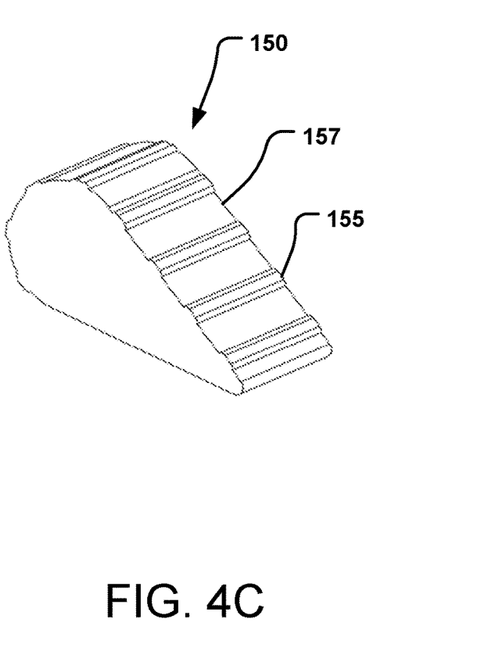
FIG. 4C is a perspective view of the retaining wedge of the clamp.

FIG. 4A shows the housing 110 and FIGS. 4B and 4C show the wedge 150 removed from the housing 110.

As described above, the housing 110 has the first, open end 112 having the aperture 120 and a second, back end 114. The interior 115 of the housing 110 is accessible through the aperture 120 at the first end 112 and also through the back end 114. In this particular embodiment, the bottom wall 118 essentially forms a right angle with the first end 112, and the top wall 116 forms an (internal) angle of about 135 degrees to the first end 112, and also forms an angle of about 45 to the bottom wall 118.

Present in the housing 110 is the lock 130, which is removeable and replaceable from within the housing 110. The lock 130 may be, for example, held in place by a bolt, screw or other fastener, such as a fastener 141 in FIG. 2. This same fastener 141 may be used to hold the side wall 111 in place, if the side wall 111 is a removeable and replaceable side wall. The lock 130 has a concave surface profile similar to the rounded second end of the wedge 150, discussed below.

Present on the exterior of the housing 110 are adjustment mechanisms 140, in this illustrated embodiment, present on both the top wall 116 and the bottom wall 118 of the housing 110. The adjustment mechanism 140 can be used to slightly adjust the distance between the top wall 116 and the bottom wall 118.

FIGS. 4B and 4C show the wedge 150 that fits within the interior 115 of the housing 110 and secures a belt when inserted into the housing 110. The wedge 150 has a first end 152 and a larger second end 154, and is asymmetrical or non-symmetrical about an axis extending from the first end 152 to the second end 154. In this design, the second end 154 is rounded, or, defined by a radius. The wedge 150 has a top side 156 and a bottom side 158. The first end 152 of the wedge 150 is slightly rounded at the tip, having an internal angle α of about 45 degrees defined by the top side 156 and the bottom side 158; usually the angle α is within the range of 30-60 degrees. The angle α of the wedge 150 is close to or matched to the angle between the top wall 116 and the bottom wall 118 of the housing 110, so that the wedge 150 fits uniformly and snugly into the interior 115. When the wedge 150 is vertically centered in the interior 115, there is a constant distance between the top surface 156 of the wedge and the inner surface of the top wall 116 and bottom surface 158 of the wedge and the inner surface of the bottom wall 118. This distance or spacing is essentially the thickness of the belt that is to be received in the clamp. In some designs, when the wedge 150 is located as close as possible to the first end 112 of the housing 110, the top surface 156 of the wedge contacts the inner surface of the top wall 116 and bottom surface 158 of the wedge contacts the inner surface of the bottom wall 118; the end 152 of the wedge 150 may extend out of the aperture 120.

The top surface 156 of the wedge 150 and the surface of the second end 154 have a plurality of raised ribs 155 with a land 157 present between adjacent ribs 155. If the belt 10 is a toothed belt with transverse profiles on the front side 16, the ribs 155 are configured to seat between the teeth of the toothed belt that is to be received in the clamp 100 and the lands 157 are configured to receive the teeth of the toothed belt.

FIGS. 5A through 5D show, stepwise, a method 500 for using the clamp 100 of this description and variants thereof.

Figure 5A:
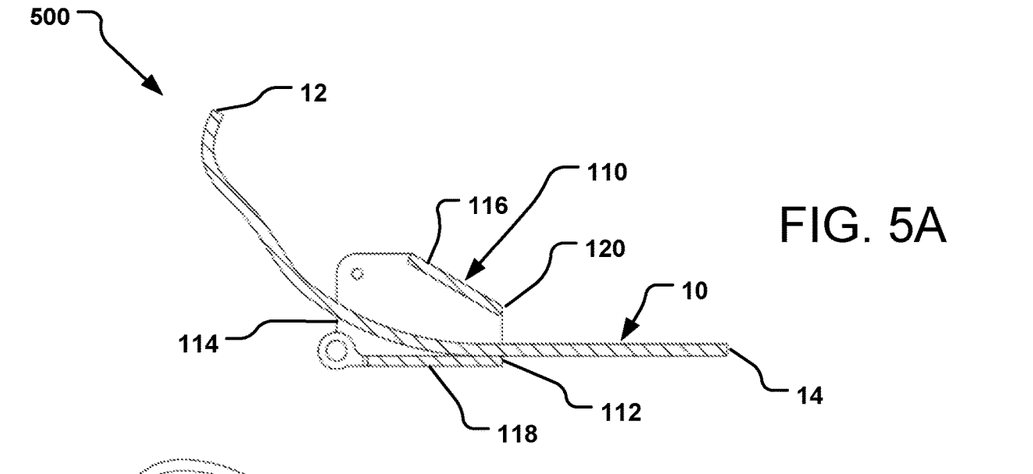

In FIG. 5A, the clamp housing 110 as described above is provided, with the side wall 111 (seen in FIG. 1A and FIG. 2) and the lock 130 removed. A belt 10 is inserted into the housing 110 through the aperture 120 at the first end 112, so that the free end (the first end 12) of the belt 10 extends out of the housing 110 at the back side 114 and the elongate end (the second end 14) of the belt 10 remains at the first end 112 out of the housing 110. The belt 10 is positioned so that the teeth of the belt 10 are facing up towards the top wall 116 of the housing 110 and the back side of the belt 10 is facing the bottom wall 118 of the housing 110.

Figure 5B:
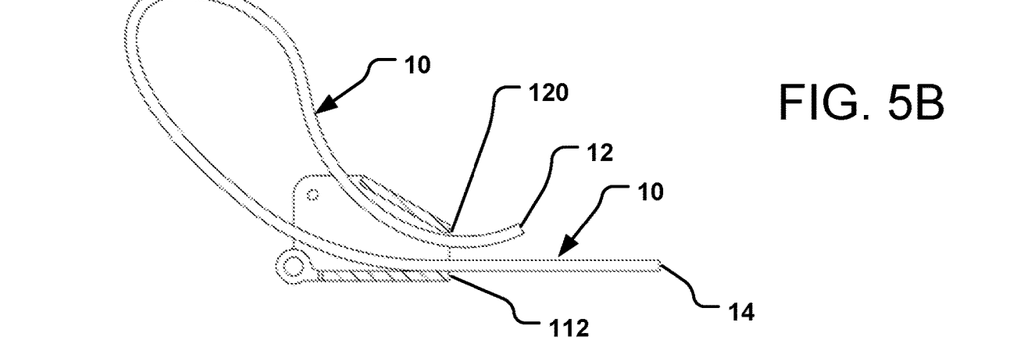

In FIG. 5B, the first end 12 of the belt is folded back toward the aperture 120, forming a bend, radius, "C", or the like, and the free end 12 is passed back through the aperture 120 at the first side 112. At this stage, little or no tension is applied to the belt.

Figure 5C:
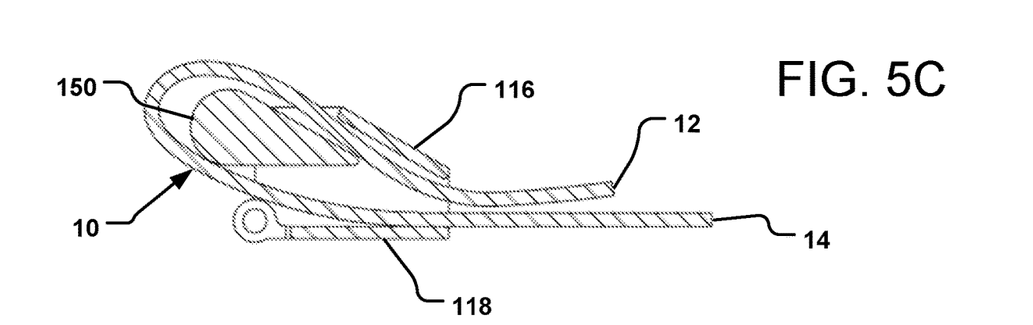

In FIG. 5C, the wedge 150 is placed into the housing 110 through the open side wall within the bend of the belt 10. The teeth of the belt and the teeth of the wedge 150 may automatically align, or some adjustment to the position of the belt may be needed. Tension is applied to the belt 10 by pulling at least the elongate end 14 of the belt and optionally the free end 12 of the belt; the same or different amount of force can be applied to the belt ends. The applied force pulls the wedge 150 so that the tapered end of the wedge 150 moves toward and optionally through the aperture 120, pinching the belt between the wedge 150 and the inner surfaces of the top wall 116 and the bottom wall 118. If adjustment of the position of the belt is desired, one or both ends of the belt can be pushed back toward the second, back end 114 of the clamp housing 110, thus releasing the pressure of the wedge 150 on the belt 10 and allowing the belt to be adjusted.

Figure 5D:
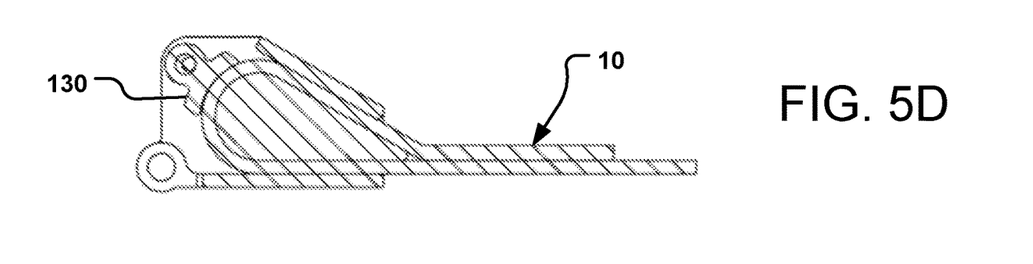

In FIG. 5D, the lock 130 is placed in the housing 110 and positioned against the belt 10 around the wedge 150. The lock 130 provides a force against the back side of the belt 10, holding the belt 10 against the wedge 150. The lock 130 may be received on a post or shaft to hold it in place. The side wall is replaced on to the housing 100 and fastened in place.

With the belt 10 so mounted in the clamp 100, with the profiled retaining wedge 150 and the lock 130, no extraneous or additional fasteners removed from the clamp 100 are needed to achieve a solid engagement of the belt 10.

It is noted that in FIGS. 5A through 5D, the belt 10 is positioned with the elongate end 14 of the belt below the free end 12 (with the elongate end against the inner surface of the bottom wall 118), so that it is the free end 12 that is in contact with the sloped, top surface of the wedge 150 and the inner surface of the top wall 116. Alternately, the belt 10 may be positioned with the elongate end 14 in contact with the sloped, top surface of the wedge 150 and the inner surface of the top wall 116 and with the free end 12 against the inner surface of the bottom wall 118. In either orientation, the front side of the belt should be against the wedge 150 and the back side of the belt should be against the inner surfaces of the top wall 116 and the bottom wall 118.

Figure 6:
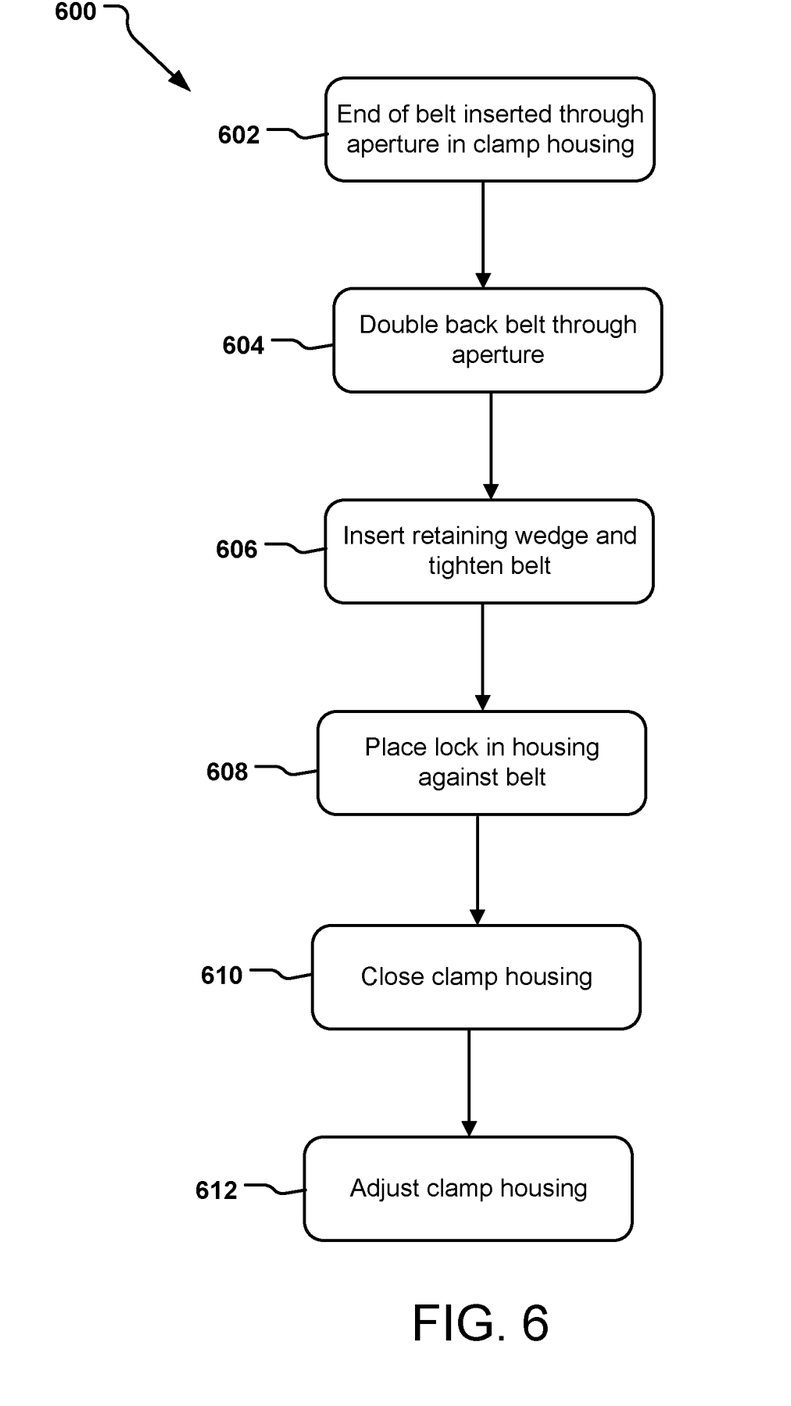
FIG. 6 is a step wise flow chart of a method for installing a flat belt on a clamp.

FIG. 6 shows a flow chart of a method 600 for using a clamp, such as the clamp 100 of this description and variants thereof.

In step 602, a free end of a belt is inserted through an aperture in an open clamp housing.

In step 604, the free end is doubled back through the aperture, leaving a loop of belt in the housing. If the belt is a toothed belt, the teeth of the belt should be on the inside of the loop. The belt can be readily adjusted within the clamp housing at this point, in order to obtain the desired position of the clamp along the belt.

In step 606, the retaining wedge is inserted into the loop and the belt is tightened around the wedge. This may be done by pulling on either or both ends of the belt. If the belt is a toothed belt and the wedge has corresponding surface features, the teeth and the features should be aligned.

In step 608, a lock is placed against the belt. The lock may be mounted on a post or other member to position the lock.

In step 610, the clamp housing is closed.

In step 612, the clamp housing may optionally be adjusted.

The clamp 100, its various elements (e.g., the housing 110, the lock 130, the wedge 150, etc.), and variations thereof, may be formed by any suitable techniques, including casting, machining, molding, etc. The clamp 100 and its elements are made from a material or martials that are sufficient to withstand the forces applied to the belt. Examples of suitable materials include metal (e.g., iron, steel, stainless steel, nickel, iron, aluminum, alloys) and ceramic materials. In some designs, the clamp 100 or any of the elements may be formed from a polymer (e.g., polycarbonate, polystyrene, polyethylene).

The above specification and examples provide a complete description of the structure and use of exemplary implementations of the invention. The above description provides specific implementations. It is to be understood that other implementations are contemplated and may be made without departing from the scope or spirit of the present disclosure. Elements of one implementation may be mixed and matched with elements from another implementation unless to the contrary. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A method of clamping an open-ended flat belt having a free end, the method comprising:
    inserting the free end of the flat belt through an aperture in a first end of a clamp housing, and passing the free end of the flat belt through the clamp housing to and through a second end of the clamp housing;
    doubling back the free end of the flat belt through the clamp housing and through the aperture to form a loop in the flat belt;
    inserting a wedge into the loop;
    applying tension to the flat belt to pull the wedge and the loop toward the aperture in the first end of the clamp housing;
    after inserting the wedge, placing a lock against the loop; and
    after placing the lock against the loop, installing a side wall on the clamp housing.

2. The method of claim 1, wherein inserting the wedge comprises inserting a wedge having a surface comprising alternating ribs and lands.

3. The method of claim 2, wherein doubling back the free end of the flat belt to form a loop comprises doubling back the free end of the flat belt so that teeth of the flat belt are in an interior of the loop.

4. The method of claim 1, wherein:
    inserting the wedge into the loop comprises inserting the wedge having a first end and a second radiused end; and
    placing the lock against the loop comprises placing the lock against the loop proximate the second radiused end of the wedge.

5. The method of claim 4, wherein inserting the wedge having the first end and the second radiused end comprises inserting the first end proximate the first end of the clamp housing and the second radiused end proximate the second end of the clamp housing.

6. A clamp comprising:
    a tapered housing having a first end with an aperture providing access to an interior of the housing and a second open end providing access to the interior, the second end larger than the first end, wherein the housing has a removeable and replaceable side wall providing access to the interior;
    a tapered wedge removable and replaceable from the interior of the housing, the wedge having a first end and a radiused second end and having a surface comprising alternating ribs and lands; and
    a lock removable and replaceable from the interior of the housing, the lock having a concave surface similar to the radiused second end of the tapered wedge.

7. A clamp comprising:
    an asymmetrical housing having a top wall, an opposite bottom wall, a first end with an aperture providing access to an interior of the housing and a second open end providing access to the interior, wherein the housing has a removeable and replaceable side wall providing access to the interior;
    an inner surface of the top wall and an inner surface of the bottom wall forming an angle in the range of 30 to 60 degrees at the first end; and
    an asymmetrical tapered wedge removable and replaceable from the interior of the housing, the wedge having a first end having an angle in the range of 30 to 60 degrees and a radiused second end and having a surface comprising alternating ribs and lands.

8. The clamp of claim 7, wherein the housing is asymmetrical about an axis from the first end of the housing to the second end of the housing.

9. The clamp of claim 7, wherein the wedge is asymmetrical about an axis from the first end of the wedge to the second end of the wedge.

10. The clamp of claim 7, wherein the inner surface of the top wall and the inner surface of the bottom wall form an angle of about 45 degrees at the first end, and the first end of the wedge has an angle of about 45 degrees.

11. The clamp of claim 7, wherein a distance between the top wall and the bottom wall is adjustable.

* * * * *